United States Patent [19]
Pratt

[11] Patent Number: 5,419,480
[45] Date of Patent: May 30, 1995

[54] APPARATUS FOR CONTINUOUS AXIAL FEEDING OF AN ELONGATE MEMBER

[75] Inventor: Arnold J. S. Pratt, Derbyshire, England

[73] Assignee: Rolls-Royce plc, London, England

[21] Appl. No.: 54,203

[22] Filed: Apr. 30, 1993

[30] Foreign Application Priority Data

May 2, 1992 [GB] United Kingdom ............... 9209576

[51] Int. Cl.⁶ .................................................. B65H 20/24
[52] U.S. Cl. ........................................ 226/108; 226/112
[58] Field of Search .................... 226/108, 112, 4

[56] References Cited

U.S. PATENT DOCUMENTS

| 222,618 | 12/1879 | Woodruff | 226/128 |
| 3,083,391 | 4/1963 | Prange | 226/112 X |
| 3,549,072 | 12/1970 | Ito | 226/112 |
| 3,711,000 | 1/1973 | Reynard et al. | 226/112 X |
| 3,926,260 | 12/1975 | Slator | 226/112 X |
| 4,593,884 | 6/1986 | Zschocke et al. | 226/112 X |

*Primary Examiner*—Daniel P. Stodola
*Assistant Examiner*—Eileen A. Dunn
*Attorney, Agent, or Firm*—Cushman Darby & Cushman

[57] ABSTRACT

A feed arrangement for a rotating bar includes a rotary drive carrying a series of axially spaced clamping devices comprising collets through which the bar passes. The clamping devices are axially reciprocated in phased sequence and the collet of each device closes upon the bar while the device is moving forwards. The sequence is so controlled that at all times the bar is clamped by the collet of at least one forwardly moving device and is thereby continuously fed forwards while being rotated by the active clamping device.

9 Claims, 3 Drawing Sheets

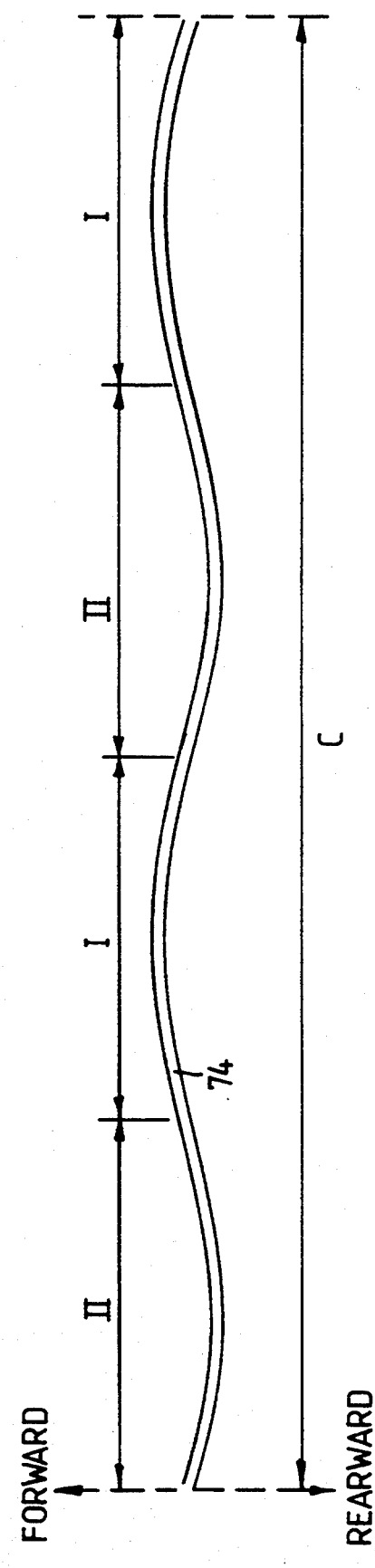

APPARATUS FOR CONTINUOUS AXIAL FEEDING OF AN ELONGATE MEMBER

FIELD OF THE INVENTION

This invention relates to axial feed arrangements for elongate members. It is particularly, but not necessarily exclusively, concerned with axial feed arrangements for applying a bar-like member against a surface while there is relative movement between the member and the surface, to coat the surface with the material from which the member is formed.

BACKGROUND OF THE INVENTION

It is already known to coat a surface by a process in which a bar or rod of consumable coating material is applied with pressure against the surface to be treated while being rotated axially at a speed that generates sufficient friction at the region of contact to ensure that the coating material flows without melting so as to coat the surface. The process makes it possible to obtain a wide variety of coatings with a high integrity bond between the coating material and its substrate.

One problem arising with this process is that the quality of the surface produced is adversely affected if the coating is not formed in a continuous process, with the feed force exerted by the consumable bar on the surface being maintained at an appropriately high value until the area to be coated is finished. That is a problem because the feed-forward mechanisms used for such a rotary friction surfacing process are limited in the length of bar stock they can advance without interrupting the feed to bring a further length into use.

It is true that continuous feed arrangements as such are known for consumable welding processes, for example, in which a welding wire is fed by a pair of oppositely rotating wheels, but such a process cannot be adapted to feeding the surfacing materials for rotary friction surfacing processes because it is not possible to apply simultaneously the required high speed rotation to the feed material. Furthermore, the rods used for rotary surface treatment processes are essentially rigid and are conveniently handled in relatively short lengths, so it would be desirable also to have a feed mechanism that was able to feed a series of rods in succession without interrupting the application of the rod material under pressure to the surface being treated.

SUMMARY OF THE INVENTION

According to the present invention, there is provided an apparatus for rotating a member about an axis of rotation and feeding it forward out of the apparatus, wherein a plurality of coaxially rotatable clamping devices are arranged to grip the member and means are provided for reciprocation of said clamping devices in phased sequence with respect to each other, each clamping device being arranged to engage the member during a forward feed stroke of said reciprocation and to release it during a reverse return stroke, whereby at all times during operation of the apparatus the member is engaged by at least one forwardly moving rotating clamping device and is thereby continuously driven forward by said devices acting in succession, while being rotated by the devices.

Preferably there are at least three said devices, having their feed strokes arranged in overlapping sequence. Said devices are preferably collets.

To exert their feed movements in corresponding phase relative to each other, the individual devices of apparatus according to the invention can be actuated by respective drive inputs of a corresponding plurality of staggered phase drive means, for example said drive inputs being actuated by a multi-phase electrical power supply, each by a different phase of said source.

In an alternative arrangement, the devices are actuated by a pair of co-rotating drive input members which are cyclically displaceable relative to each other, the clamping devices being rotated by at least one of the members and being reciprocated by the cyclic displacements between the members.

By way of example, embodiments of the invention will be described with reference to accompanying drawings, in which:

BRIEF DESCRIPTION OF THE DRAWINGS

FIG. 3 is a developed plan view of a cam groove forming part of the FIG. 2 embodiment.

DETAILED DESCRIPTION OF THE INVENTION

Figure 1:
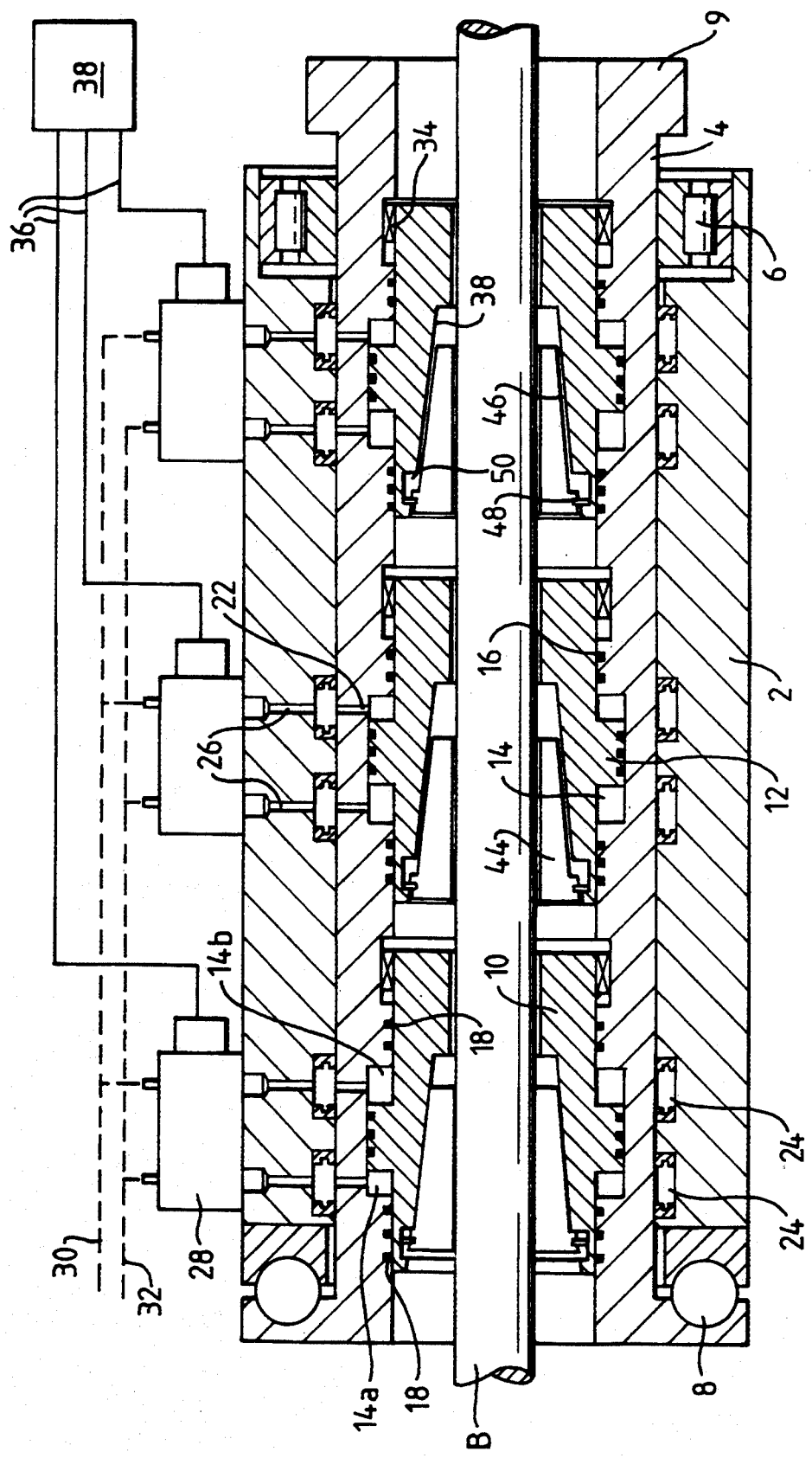
FIG. 1 is an axially sectioned side view of one form of axial feed arrangement according to the invention.

The arrangement shown in FIG. 1 comprises a stationary housing 2 providing a rotary support for a coaxial sleeve 4 through axial and thrust bearings 6,8. The sleeve is provided with a ring gear 9 which engages other gearing (not shown) to rotate the sleeve in the axial bearings 6. Spaced at intervals along the tube are three identical annular pistons 10. Each piston has a head 12 located in an identical cylindrical recess 14 in the inner wall of the sleeve 4 and carrying sliding seals 16 engaging the recess to divide it into two discrete chambers 14a,14b. Similar seals 18 on the sleeve inner wall on opposite sides of the recess close off the chambers.

From each pair of chambers 14a,14b respective ports 22 extend radially through the sleeve to circumferential galleries 24 in the inner wall of the housing 2 from which pairs of inlet and outlet passages 26 extend to respective electrically operated servo-valves 28. Common pressure fluid supply and return lines 30,32 are connected to each of the valves 28, which can be switched to connect its pair of passages 26 reversibly one to the supply line and the other to the return line.

The three pistons are rotationally fixed to the sleeve by splined connections 34. They therefore rotate with the sleeve but they can be reciprocated individually by a pressure difference between the chambers 14a,14b on opposite sides of each piston head, as determined by the setting of the respective valve 28. The three valves 28 are controlled by the respective phase outputs 36 of a three-phase signal generator 38 so that the connections of the three pairs of passages 26 are switched at 120° intervals with respect to the supply frequency of the signal generator.

Each piston 10 has an inner conically tapered face 42 within which a collet 44 having a tapered outer face 46 complementary to the conical face of the piston is housed with limited axial freedom by a slide ring 48 movable in axial recess 50 of the piston.

The arrangement is intended to rotate a round bar B extending coaxially through the pistons 10 and their collets 44 and to move the bar 8 forwards as it rotates.

When fluid pressure is applied to the rear chamber 14b behind a piston head 12, the piston 10 is forced forward and closes the collet 44 onto the bar to apply to the rod both a torque and a forwards driving force for the remaining forward stroke of the piston. When the associated valve 28 reverses the connections to the chambers 14a,14b, the grip on the bar is released and the piston returns to its rearmost position. Since the valves 28 are operated in a phased sequence, the cycles of the three pistons are correspondingly staggered. At least one of the pistons is therefore moving forwards with the gripped bar at any instant in the 3-phase cycle. Since all the pistons rotate continuously the bar is continuously driven forwards while it rotates.

If the 3-phase signal generator 38 is a sinusoidal or saw-tooth signal generator, for example, the forward pressure applied to the bar will fluctuate as successive phase signals pass through their peaks. It is possible, however, to utilise step-change signals, or to employ servo-valves 28 of a type which will switch over substantially instantaneously at a predetermined signal level, so that the displacements of the pistons are initiated by full fluid pressure and the forward force generated by the pistons acting in sequence is substantially uniform.

If required, the forward pressure applied to the bar can be modified by varying the fluid supply pressure or by otherwise controlling the pressure differential between the chambers 14a,14b on opposite sides of each piston. Independently of the feed pressure, the feed rate can also be varied by altering the frequency of the three-phase signal, which determines the rate of reciprocation of the pistons.

It is also possible to operate the arrangement described above using a single-phase supply sequenced by such means as mechanical trips co-rotating with the sleeve to actuate the valves 28 in staggered relation.

Figure 2:
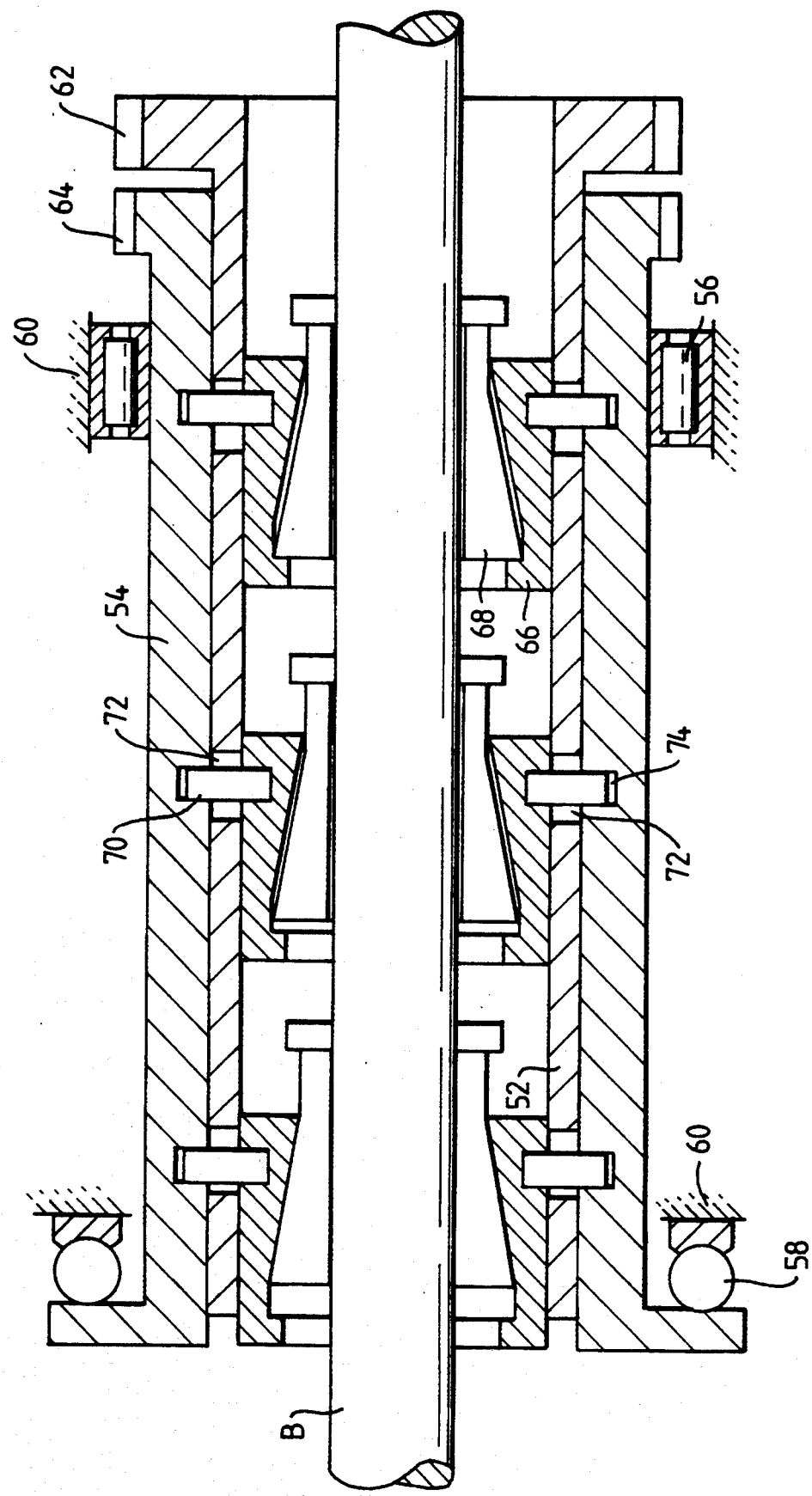
FIG. 2 is an axially sectioned side view of another axial feed arrangement according to the invention.

In the alternative arrangement shown in FIG. 2, coaxial inner and outer sleeves 52,54 are mounted in rotary bearings such as the side and thrust bearings 56,58 in a fixed housing 60. There are respective rotary drive inputs to both sleeves, as through the end gears 62,64, to rotate them. The drive is preferably from the respective electric torque motors (not shown) whose relative speeds can be precisely controlled. The two sleeves are capable of rotational movement relative to each other, but are both in an axially fixed relation relative to the housing 60.

Within the inner sleeve is a series of three pistons 66 each of which, similarly to the pistons of the first embodiment, retains and cooperates with a collet 68 to rotate and advance the bar B which passes through the collet. Drive pins 70 fixed to the pistons project radially outwards through axially extending slots 72 in the inner sleeve and into constant depth axially contoured cam grooves 74 which extend in the circumferential direction around the inner face of the outer sleeve. At any instant, therefore, the pins 70 are located axially by the grooves 74 and circumferentially by the apertures 72.

FIG. 3 is a developed plan view of one of the cam grooves 74, showing the axial contouring of the groove over the inside circumference C of the sleeve 54. The contouring is sinusoidal in form, part I providing the driving stroke of the corresponding piston and part II the return stroke. It is necessary that the number of sinusoidal pitches in each groove equal the number of drive pins in each piston. Two pins 70 have been assumed for each piston in FIG. 3. This is an adequate number provided that they are of suitably hardened steel and are circumferentially spaced 180° apart on opposing sides of the assembly as shown.

If the inner and outer sleeves 52,54 are rotated at the same speed, the drive pins 70 are stationary in the cam grooves 74 of the outer sleeve. If there is a relative speed difference between the sleeves, since the pins 70 are restrained circumferentially relative to the inner sleeve, they will move along the grooves 74. Because the outer sleeve is located axially by the housing 60, the drive pins are thus displaced axially forwards or rearwards in accordance with the local slope of the groove 74 in which each pin is sitting. All the pins rotate together with the inner sleeve by virtue of their engagement with the respective axial apertures 72. When each pin 70 moves forwards it carries its piston 66 with it and the collet 68 is gripped onto the rod R which thus moves forwards also. When the pin moves back again, the bar is released.

The axially contoured cam grooves 74 which control the advance and return of the three pistons are staggered at 120° to each other, so that a continuous drive is obtained in a similar manner to the first example. The rate of advance of the bar will depend, in this instance, upon the speed difference between the two sleeves.

Where necessary, the uniformity of the feed rate and of the pressure applied to the rod may be improved by employing more than three drive devices, so that the phase difference between the operation of successive gripping devices is less. However, it is also possible to have as few as two drive devices. This could be achieved in the case of the second example by arranging the profile of the cam grooves 74 in the outer sleeve to prolong the driving stroke of each piston so that it extends over more than 180° of its cycle.

Although FIG. 3 illustrates cam grooves 74 of sinusoidal form, it will be evident to those skilled in the art that the invention should not be limited to grooves of this form. For instance, a saw-tooth wave form could also be utilised.

It may be noted that both the examples illustrated in FIGS. 1 to 3 are relatively compact arrangements and they can be accommodated in the head stocks of many existing rotary bar stock feeders.

I claim:

1. An apparatus for rotating a member about an axis of rotation and feeding it in a forward direction out of the apparatus at a selected rate of feed, said apparatus comprising a plurality of coaxially rotatable clamping devices each disposed to grip the member, means for reciprocating said clamping devices in phased sequence with respect to each other, each said clamping device being disposed to engage the member during a feed stroke in said forward direction and to release said member during a reverse, return stroke in the opposite direction to said forward direction, said clamping devices being disposed relative to one another so that during operation of the apparatus, the member is engaged by at least one forwardly moving, rotating clamping device to thereby continuously drive the member forward by said clamping devices acting in succession while being simultaneously rotated by said clamping devices, each said clamping device including a circular member disposed within a clamping housing through which said member extends, said apparatus including rotary drive means for rotating said housings of said clamping devices synchronously, said circular members being collapsible upon engagement by said reciprocating means so that the forward displacement of each housing closes said circular members onto the member to transmit both the forward and rotary motions thereto.

2. An arrangement according to claim 1 wherein there are at least three said clamping devices arranged to move forwards in overlapping sequence.

3. An arrangement according to claim 1 wherein the clamping devices are spaced from each other in said axial direction.

4. An apparatus as claimed in claim 1 wherein a fluid pressure member is provided for operating each said clamping device and means are provided for regulating the pressure fluid to control the force applied to the rotating member by said clamping devices.

5. An arrangement according to claim 1 wherein means are provided for adjusting the rate of rotation of the member.

6. An arrangement according to claim 1 wherein means are provided for controlling the rate of feed of the rotating member independently of the rate of rotation.

7. An arrangement according to claim 1 wherein the individual clamping devices are actuated by respective drive inputs of a corresponding plurality a staggered phase drive inputs.

8. An arrangement according to claim 7 wherein a multi-phase source is included and wherein the phases of said multi-phase source provide sequential signals actuating respective drive inputs for reciprocation of the clamping devices out of phase with each other.

9. An arrangement according to claim 8 comprising a 3-phase supply for actuating a series of three clamping devices.

* * * * *